United States Patent [19]

Hamley

[11] 4,223,656

[45] Sep. 23, 1980

[54] HIGH ENERGY SPARK IGNITION SYSTEM

[75] Inventor: James P. Hamley, Crystal Lake, Ill.

[73] Assignee: Motorola, Inc., Schaumburg, Ill.

[21] Appl. No.: 955,552

[22] Filed: Oct. 27, 1978

[51] Int. Cl.³ .............................................. F02P 3/06
[52] U.S. Cl. ............................ 123/598; 315/209 CD; 123/604; 123/654
[58] Field of Search ..... 123/148 E, 148 CA, 148 DS, 123/148 CC, 148 CB, 148 DC, 148 ND; 315/209 CD, 209 SC

[56] References Cited

U.S. PATENT DOCUMENTS

| | | | |
|---|---|---|---|
| 3,505,563 | 4/1970 | Randall et al. | 123/148 E |
| 3,621,826 | 11/1971 | Chrestensen | 123/148 E |
| 3,754,541 | 8/1973 | Sasayama | 123/148 E |
| 3,788,293 | 1/1974 | Anderson | 123/148 CB |
| 3,880,132 | 4/1975 | Whatley | 123/148 CC |
| 4,029,072 | 6/1977 | Goto et al. | 123/148 E |
| 4,033,316 | 7/1977 | Birchenough | 123/148 E |
| 4,083,347 | 4/1978 | Gräther et al. | 123/148 CA |

FOREIGN PATENT DOCUMENTS 2448302 4/1975 Fed. Rep. of Germany ... 123/148 CA
682460 11/1952 United Kingdom ................ 123/148 E Primary Examiner—Charles J. Myhre
Assistant Examiner—Andrew M. Dolinar
Attorney, Agent, or Firm—James W. Gillman; Joseph T. Downey

[57] ABSTRACT

A pulse transformer produces sufficient energy at its secondary winding to initiate arcing of a spark gap in response to the interruption of current flow to its primary winding. Upon initial arcing of the spark gap, a charged capacitor is coupled across the gap thereby extending arcing duration beyond that produced by the coil. The total spark energy is determined by the value of the capacitor and the voltage to which it is charged.

The invention is adaptable to provide spark energy to each cylinder of a multicylinder engine without the need for a distributor.

12 Claims, 4 Drawing Figures

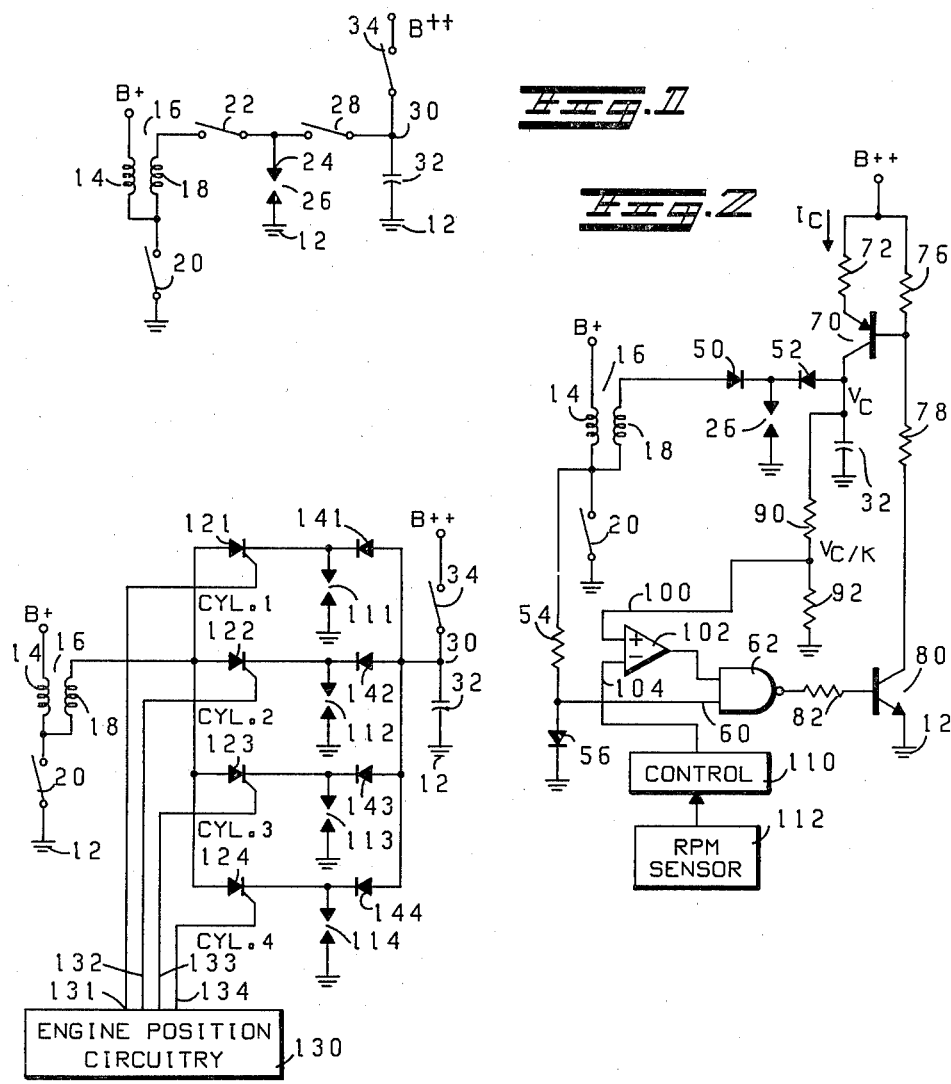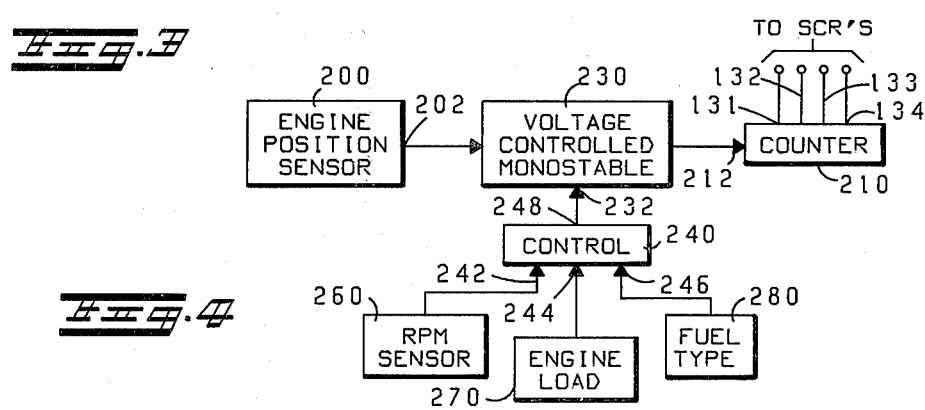

HIGH ENERGY SPARK IGNITION SYSTEM

BACKGROUND OF THE INVENTION

The present invention pertains to the spark ignition art and, more particularly, to high energy electronic ignition system.

Spark ignition systems are well known, particularly in the automotive art. Such systems fall in basically one of three types:

(1) The conventional, or Kettering system;
(2) capacitive discharge systems; and
(3) inductive storage systems.

In the Kettering system, a magnetic field is built up in an ignition autoformer, or coil. At the time of ignition firing, current is interrupted whereby a high voltage spark is developed at the spark plug. The basic problem with the Kettering system is that the coil must be large and bulky in order to provide both the high voltage and high current required to sustain the flame front. This large size results in substantial capacitance at the coil secondary, whereby the rise time of the voltage at the spark plug is relatively slow. Thus, proper timing becomes a problem. Further, the size of the coil necessitates locating the coil at a remote location from the distributor whereby the two must be interconnected via a suitable cable. The cable results in an additional capacitance at the secondary of the coil, thus further degrading rise time of the pulse, as well as leading to engine faults through insulation degradation and to the generation of radio frequency interference.

A further problem with the Kettering system is its failure to maintain a high engine spark voltage at high RPM.

Finally, the Kettering system is relatively inefficient in that since it uses the coil as the main energy storing element, the coil must be current driven for a substantial time before it can develop sufficient magnetic field to create the required spark. Thus, there are significant coil $I^2R$ losses.

The capacitive discharge ignition attempts to overcome some of the shortcomings of the Kettering system. Here, a capacitor is charged to a voltage higher than that normally developed at the primary of the Kettering system, whereby at firing the capacitor is switched to the primary of the coil. Since the voltage of the primary of the coil is higher with this system, the coil need require fewer secondary turns thus reducing its secondary capacitance and allowing faster rise times. Further, the coil may be charged to a voltage such that its stored energy will maintain a high spark energy over increasing RPM. A primary disadvantage to the capacitive discharge ignition system is that it still requires a relatively large ignition coil, thus suffering the disadvantages described above. Moreover, the energy stored in the capacitor, as transformed through the ignition coil, is generally not sufficient to maintain a long burn time such as is normally required for efficient engine operation in lean burned type engines.

Finally, considerable work has been done with inductive storage, or transistor aided type ignition systems. Here, a transistor replaces the points of the standard Kettering system and logic circuitry controls the dwell time such that at higher RPM the percent dwell increases, thereby maintaining a substantially high spark energy. The principle problem with these systems are similar to those shared by the Kettering system, namely the need for a large ignition coil and its attendant problems, including inefficiency.

It should also be mentioned that with respect to the capacitive discharge ignition system and especially the inductive storage system, elaborate schemes have been developed to control these systems such that a constant spark energy is maintained as a function of RPM. Thus, cost and reliability are serious drawbacks of such systems.

A further problem with ignition systems of all of the above described type is that they require a mechanical distributor to properly distribute the high tension sparking voltage to the various spark plugs of a multicylinder engine. Such mechanical distributors are, of course, subject to wear and must be frequently maintained to provide optimum operation and engine efficiency.

The development of more elaborate ignition systems has resulted from the requirement for higher engine efficiency as well as lower engine produced pollution. It has been found that by producing a relatively long duration, controlled energy spark, more of the gas air mixture in the cylinder can be burned thus increasing engine efficiency and reducing hydrocarbon pollutants.

SUMMARY OF THE INVENTION

It is an object of this invention, therefore, to provide an improved spark ignition system which is capable of producing a controlled spark energy over a wide range of engine RPM, which system is inexpensive to manufacture and reliable in operation.

It is a further option of this invention to provide the above described ignition system which exhibits a faster spark rise time than known in prior systems.

It is an additional object of the invention to provide the above described ignition system for use in a multicylinder engine, which system does not require the use of a mechanical engine, which system does not require the use of a mechanical distributor.

Briefly, according to the invention, the instant ignition system is operable for producing a timed arcing potential across a spark gap. The system includes an ignition coil having predetermined primary and secondary windings and predetermined coupling therebetween. A coil coupling means couples the secondary winding to the spark gap. Current is produced through the primary winding by suitable means, which current is interrupted at the desired time of arcing such that an arcing potential appears across the spark gap. An energy storage means couples to the spark gap and maintains the arcing condition across the spark gap for a time duration exceeding that otherwise produced by the coil.

The instant system is adapted for providing spark ignition in a multicylinder engine but by further including a first switching means which is operable to couple any selected one of multiple spark gaps to said coil secondary winding. A control means, which responds to engine position, causes a switching means to couple each one of the spark gaps to the secondary winding at a predetermined engine position. The energy storage means is coupled, via the second switching means to that spark gap which received an initial arcing potential from the ignition coil whereby an increased arcing duration time is produced.

BRIEF DESCRIPTION OF THE DRAWINGS

FIG. 1 is a schematic diagram illustrating the basic configuration of the instant system;

FIG. 2 is a more detailed schematic diagram illustrating a preferred embodiment of the instant ignition system;

FIG. 3 is a schematic diagram illustrating the preferred embodiment of a multicylinder, distributorless engine system according to the invention; and FIG. 4 is a block diagram illustrating the constituent components of the engine position circuitry shown in FIG. 3.

DETAILED DESCRIPTION OF THE PREFERRED EMBODIMENTS OF THE INVENTION

FIG. 1 is a schematic diagram illustrating the basic operation of the instant inventive system. A source of DC bias potential, B+, is coupled between a ground terminal 12 and one end of the primary 14 of an ignition coil 16. Transformer 16 is further provided with a secondary winding 18 and, which is predeterminedly intercoupled to the primary 14 to provide an arcing potential at the secondary, as will be more fully understood hereinbelow. The primary winding 14 and secondary winding 18 are common connected at one free end and series connect through a single pole single throw switch 20 to the ground terminal 12. Switch 20 corresponds to the breaker points in a conventional ignition system and is suitably coupled to the engine such that at the desired engine position for ignition firing switch 20 is opened. It should be noted that there are numerous commercially available embodiments to switch 20 including reluctance sensor configurations and optical couplers.

The free end of secondary winding 18 series connects through a switch 22 to the high end 24 of a spark gap 26. The other contact of spark gap 26 connects to ground 12.

A third switch 28 series connects the high end 24 of spark gap 26 to the common connection 30 of a capacitor 32, whose remaining free end connects to ground 12, and a fourth switch 34 which is operable to series connect to a source of high voltage B++.

In operation, during dwell time, i.e. during the time that switch 20 is closed, switches 22 and 34 are also closed whereby current is built up in the primary of transformer and with switch 28 open a voltage is separately developed in the capacitor 32. The purpose of the transformer 16 is to develop a voltage of sufficient magnitude to initiate breakdown of the spark gap 26. Thus, transformer 16 need be of the high voltage, but low current type. Thus, in the preferred embodiment of the invention, transformer 16 is comprised of a conventional pulse transformer which exhibits excellent rise time characteristics, thereby assuring proper ignition timing, as well as being of small construction. In fact, pulse transformer 16 may be built into a distributor of a conventional ignition, thus eliminating any connecting leads and the problems associated therewith.

At the time of ignition firing, i.e. upon opening of switch 20, switches 22 and 28 are closed, with switch 34 being opened. Due to the interruption of current in its primary, pulse transformer 16 produces a high tension voltage at its secondary winding 18 which causes initial arcing across the spark gap 26. Upon firing of the spark gap 26, the voltage thereacross drops to a relatively low, or substaining value. This value is a function of the nature of the spark gap and the atmosphere in which it is placed. It is important for proper operation of this system that the capacitor 32 be charged to a voltage equal to or greater than the spark gap sustaining voltage.

Thus, with the voltage across spark gap 26 dropping to a low value, the capacitor 32 is now free to dump current through the spark plug thereby creating a longer duration, controlled energy spark than otherwise would be supplied from the windings of pulse transformer 16.

Since the spark energy is primarily determined by the voltage across, and the capacitance of capacitor 32, this energy may be maintained constant independent of engine RPM without the use of any special sensors or elaborate circuit processing.

FIG. 2 is a more detailed schematic diagram illustrating a preferred embodiment of the instant ignition system shown in FIG. 1. In FIG. 2, the same reference numerals are used to indicate the same portions of the ignition systems as are shown in FIG. 1. Here, the switches 22 and 28 of FIG. 1 have been replaced by switching diodes 50, 52. Diode 50 need be only a low voltage, low current type whereas diode 52 must be able to withstand an instantaneous high voltage and also must be capable of handling a substantial peak current. The diode used as a high voltage rectifier in television may be used for these purposes.

During dwell time, switch 20 is closed thus building up current in the pulse transformer primary 14. The voltage across the switch 20 is sensed by a resistor 54 and a diode 56. For the dwell condition, with switch 20 closed, the diode 56 is forward biased and, thus, provides a logic low input to one input 60 of a conventional NAND gate 62.

Switch 34 of FIG. 1 is comprised in the circuit of FIG. 2 of a transistor 70 having its emitter connected through a current limiting resistor 72 to the high tension voltage source B++. The collector of transistor 70 connects to the common connection of capacitor 32 and switching diode 52. The base of transistor 70 connects through a current determining resistor 76 to the power supply B++. In addition, the base of transistor 70 couples through a further current limiting resistor 78 to the collector of a switching transistor 80. The emitter of transistor 80 is connected to the ground terminal 12 and its base is connected through a current limiting resistor 82 to the output of NAND gate 62.

The voltage across capacitor 32 is sensed by a voltage divider comprised of resistors 90, 92. Thus, in a well known manner, the voltage appearing at the common connection of resistors 90, 92 is the voltage across the capacitor of $V_c$ divided by a constant, k, determined by the value of resistors 90, 92. This divided down voltage is applied to the non-inverting input 100 of a conventional differential amplifier, or components, 102. The inverting input 104 of amplifier 102 is connected to a control block 110 which, in turn, senses the RPM of the engine via a conventional RPM sensor 112.

In, operation the capacitor 32 is substantially discharged such that the voltage thereacross, $V_c$, is low whereby the divided voltage $V_c \div k$ is less than a threshold voltage established by a control 110 at the noninverting input 104 of amplifier 102. Thus, the output from amplifier (or comparator) 102 is low thereby causing the output of NAND gate 62 to switch to a high state. This, in turn, forward biases transistor 80 thereby biasing on transistor 70 and causing capacitor 32 to charge from the voltage supply B++. As will be understood to one of ordinary skill in this art, transistor 70, along with resistors 72, 76 and 78 form a constant current source. Thus, capacitor 32 will be charged at a constant current rate, $I_c$.

In this mode, the voltage across capacitor 32 increases until the value of $V_c \div k$ exceeds the threshold level thereby causing one input of NAND gate 62 to go low. This turns off transistor 80 which in turn turns off transistor 70 which has the same effect as opening the switch 34 of FIG. 1. It is imperative to the system that the charging process of capacitor 32 take place in suitable time to prepare for subsequent ignition firings. The rate at which capacitor 32 charges is, of course, dependent upon the value of the capacitance as well as the magnitude of the current $I_c$.

At the time of desired ignition firing, switch 20 opens whereby the high voltage developed at the secondary 18 of pulse transformer 16 is coupled through the diode 50 and is applied across the spark gap 26 causing the arcing thereof. The diode 52 prevents the high voltage spark from being shunted by capacitor 32 since the cathode of diode 52 is at a higher potential than its anode during initial arcing.

Once the spark gap 26 arcs over, the voltage across it reduces to a relatively low value whereby the voltage across capacitor 32 creates a discharge current through diode 52 and thus sustains arcing of spark gap 26. Diode 50 prevents discharge of capacitor 32 through the secondary 18 of ignition coil 16.

As will be understood, the total spark energy is uniquely defined by the energy stored in capacitor 32. Thus, by using a constant value capacitor and by charging it to the same voltage during dwell time, a constant, high energy spark can be assured in the spark gap 26 without the need for elaborate sensors or electronic configurations.

In some designs, however, it may be desirable to vary the spark energy as a function of some external parameter, such as engine RPM. Thus, a conventional sensor, such as RPM sensor 112 monitors the desired parameter and produces an electrical output corresponding thereto, which output is coupled to the control circuit 110. Control circuit 110 then produces a suitable output voltage which is used as the reference at the inverting input 104 of amplifier 102. Varying of the voltage at the inverting input 104 has, obviously, a direct effect on the voltage which is allowed to develop across capacitor 32 and, thus, become spark energy.

It should be noted that whereas the embodiment of the invention illustrated in FIG. 2 utilizes diodes and a transistor for some of the switching functions shown in FIG. 1, it should be clear that any standard switching device may be used such as reed relays, silicon controlled rectifiers, silicon controlled switches and so forth.

The present system is easily adapted to create a distributorless ignition system, as is shown in FIG. 3. As before, those elements in FIG. 3 which are identical to elements shown in FIGS. 1 and 2 are given the same reference numeral. Here, a distributorless ignition system for a four cylinder engine is shown. Four spark gaps 111-114 correspond to spark plugs found in each of the four cylinders of the engine.

Initial arcing potential from ignition coil 16 is provided to a particular one of the spark plugs 111-114 through one of a series of four silicon controlled rectifier switches 121-124. As shown, each cathode of the silicon controlled rectifiers 121-124 connects to one terminal of the spark plug, whereas the anodes are connected in common to the second winding 18 of ignition coil 16. Each gate terminal of the silicon controlled rectifiers 121-124 is connected to one of four inputs 131-134 of an engine position circuitry block 130. Engine position circuitry block 130, which is more fully detailed in FIG. 4, produces a pulse at one of its outputs 131-134 corresponding to the desired firing time of one of the spark plugs 111-114 with respect to engine position.

In addition, the cathodes of four isolating diodes 141-144 connect to the common connection of the spark plugs 111-114 and the silicon controlled rectifiers 121-124. The anodes of the switching diodes 141-144 connect in common and, in turn, connect to the common connection of switch 34 and capacitor 32.

In operation, the engine position circuitry 130 produces a pulse at a predetermined one of its outputs 131-134, dependent upon engine position, at the time of opening of switch 20. Thus, a selected one of the silicon controlled rectifiers 121-124 is forward biased thereby routing the high tension from the secondary winding 18 of engine coil 16 to a predetermined one of the spark plugs 111-114. The switching diodes 141-144 prevent the high tension arcing potential from also being applied to the charging capacitor 32 or another of the spark plugs. Upon arcing of the selected spark plug, the potential thereacross drops whereby, as before, the charge accumulated across capacitor 32 produces a dumping current through the selected spark plug, thereby controlling spark energy and time duration.

Thus, in the system according to FIG. 3, the high tension arcing potential developed by the ignition coil 16, as well as the sustaining current supplied by capacitor 32, are conveniently switched to a selected one of the spark plugs without the requirement of a mechanical distributor.

It should also be noted that whereas silicon controlled rectifiers are illustrated as the switching elements in the embodiment of FIG. 3, other switching devices, such as relays could be utilized.

FIG. 4 illustrates the preferred construction of the engine circuitry shown as block 130 in FIG. 3. An engine position sensor 200 produces pulses at its output 202 corresponding to those engine positions in which ignition firing is to occur. Such engine position sensors 200 are well known in the automotive art, and commonly comprise a reluctance sensor mounted near the engine's flywheel, with magnets being provided on the flywheel corresponding to predetermined engine positions.

The circuitry which actually drives the gates of the SCR's 121-124 of FIG. 3 is an one of four output counter 210. Counter 210 is of a conventional type and responds to pulses at its input 212 to activate sequential ones of its output 131-134. It may be easily understood that in an ignition system which does not require ignition advance, the output 202 from engine position sensor 200 could be connected directly to the input 212 of counter 210 thereby providing desired ignition timing.

However, the embodiment of the engine position circuitry of FIG. 4 contemplates a variable ignition advance. This is accomplished by interposing a voltage controlled monostable 230 between the engine position sensor output 202 and the counter input 212. The counter 210 is arranged to trigger off the trailing edge of an output pulse from the voltage controlled monostable 230. Thus, upon voltage controlled monostable 230 receiving a pulse from engine position sensor 200, it generates a predetermined time duration pulse, as determined by the voltage appearing at its control input 232, the sensation of which increments the counter 210 thereby firing an appropriate SCR. By varying the width of the pulse produced by voltage controlled monostable 230, ignition advance can be effected.

The voltage applied to the control input 232 of voltage controlled monostable 230 is provided from a control circuit 240. Control circuit 240 has provided inputs 242, 244 and 246 which are fed from an RPM sensor 260, an engine load sensor 270 and a fuel type sensor, respectively. The sensors 260, 270 and 280 sense parameters which affect the desired timing advance. It should be understood that other sensors could be employed for sensing other parameters also affecting desired ignition advance. The control circuit 240 responds to the outputs from the sensors 260, 270 and 280 to produce a predetermined control voltage at its output 248 which is then used to control the width of the pulse of the voltage controlled monostable 230.

The design of the control block 240 would be obvious to one of ordinary skill in this art in view of the instant specification. However, it should be noted that for instances wherein the sensors 260, 270 and 280 produce DC outputs, the control block 240 may be comprised of a conventional multiple input summing amplifier.

In summary, an improved ignition system has been described which is capable of precisely determining the time duration and energy in a spark gap discharge. The invention finds particular application in automotive vehicles, wherein sparking energy may be optimized for maximum engine efficiently with minimum pollution components.

In addition, the manner by which the instant invention may be integrated into a distributorless ignition system for use in a multicylinder engine has been shown.

While a preferred embodiment of the invention has been described in detail, it should be apparent that many modifications and variations thereto are possible, all of which fall within the true spirit and scope of the invention.

I claim:

1. An ignition system for producing a timed arcing potential across a spark gap comprising:
    ignition coil means having predetermined primary and secondary windings and predetermined coupling therebetween;
    coil coupling means for coupling said secondary winding to said spark gap;
    means for producing a current through said primary winding;
    means for interrupting said primary current at the desired time or arcing such that an arcing potential appears across said spark gap;
    predetermined value capacitor means;
    power supply means for charging said capacitor means to a voltage at least as great as the sustaining voltage of said spark gap, said power supply means being responsive to at least one external parameter to control the voltage across said capacitor; and
    means for coupling said charged capacitor means across said spark gap upon initial arcing thereof caused by said coil such that stored energy in said capacitor causes an increased time duration of spark gap arcing over that otherwise produced by said coil.

2. The ignition system of claim 1 wherein said power supply means further includes control means controlling the voltage to which said capacitor means is charged and external parameter sensor means, coupled to said control means, producing an electrical output corresponding to the detection of said external parameter.

3. The ignition system of claim 2 wherein said control means further includes a voltage divider means detecting a voltage corresponding to the voltage on said capacitor means.

4. The ignition system of claim 3 wherein said control means further includes a differential amplifier responsive to said electrical output from said external sensor means and said voltage divider means, said differential amplifier operating to control the charging of said capacitor means.

5. The ignition system of claim 4 wherein said control means further includes logic means, coupled to the output of said differential amplifier, disabling said power supply means during interruption of the primary current in said ignition coil.

6. The ignition system of claim 5 wherein said power supply means includes a constant current source for charging said capacitor means.

7. An ignition system for a multicyclinder engine wherein ignition in each cylinder is intiated by the arcing of a spark gap provided therein, said arcing of each cylinder occurring at a predetermined position of said engine, the system comprising:
    ignition coil means having predetermined primary and secondary windings with a predetermined coupling therebetween;
    means for producing a current through said primary winding;
    means for interrupting said primary current at the desired time of arcing of each spark gap such that an arcing potential appears at said secondary winding;
    first switching means operable to couple any selected one of said spark gaps to said secondary winding;
    control means, responsive to engine position, for causing said switching means to couple each one of the spark gaps to said secondary winding at a predetermined engine position;
    predetermined value capacitor means adapted to be coupled to any one of said spark gaps;
    power supply means for charging said capacitor means to a voltage at least as great as the sustaining voltage of said spark gap, said power supply means being responsive to at least one external parameter to control the voltage across said capacitor; and
    second switching means for coupling said charged capacitor means to that spark gap which received an initial arcing potential from said ignition coil such that said charged capacitor means causes an increased arcing duration time than is otherwise provided by said coil.

8. The ignition system of claim 7 wherein said power supply means further includes control means controlling the voltage to which said capacitor means is charged and external parameter sensor means, coupled to said control means, producing an electrical output corresponding to the detection of said external parameter.

9. The ignition system of claim 8 wherein said control means further includes a voltage divider means detecting a voltage corresponding to the voltage on said capacitor means.

10. The ignition system of claim 9 wherein said control means further includes a differential amplifier responsive to said electrical output from said external sensor means and said voltage divider means, said differential amplifier operating to control the charging of said capacitor means.

11. The ignition system of claim 10 wherein said control means further includes logic means, coupled to the output of said differential amplifier, disabling said power supply means during interruption of the primary current in said ignition coil.

12. The ignition system of claim 11 wherein said power supply means includes a constant current source for charging said capacitor means.

* * * * *